Oct. 6, 1959  W. A. HOYER ET AL  2,907,900
PULSE GENERATOR
Filed Oct. 13, 1958
FIG. 2.
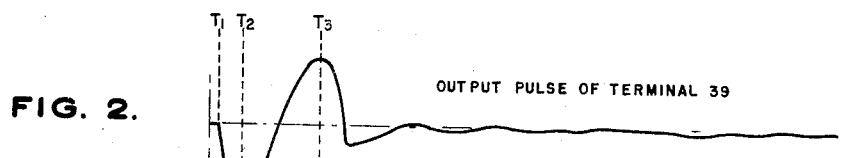
OUTPUT PULSE OF TERMINAL 39
FIG. 3.
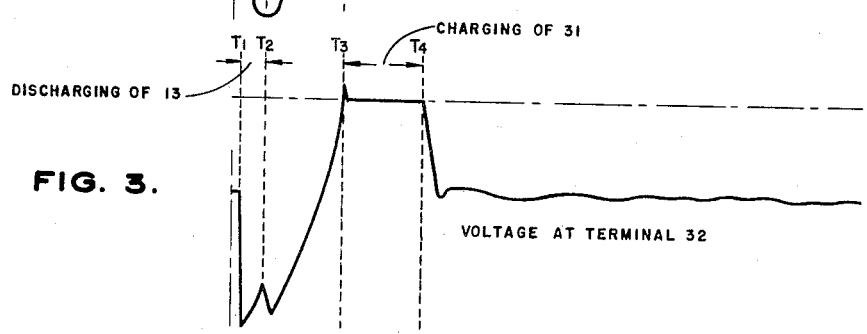
DISCHARGING OF 13
CHARGING OF 31
VOLTAGE AT TERMINAL 32
FIG. 4.
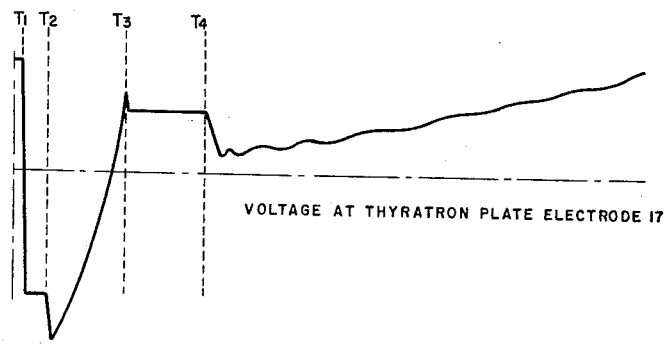
VOLTAGE AT THYRATRON PLATE ELECTRODE 17
FIG. 5.
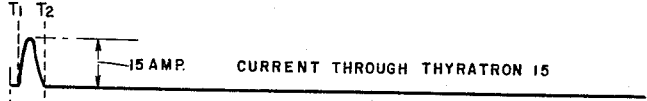
15 AMP. CURRENT THROUGH THYRATRON 15
FIG. 6.
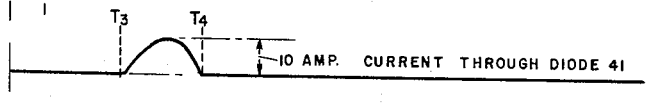
10 AMP. CURRENT THROUGH DIODE 41
FIG. 7.
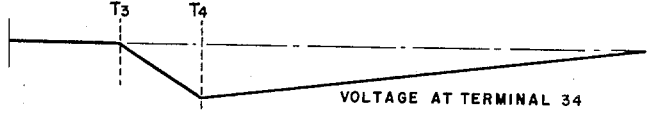
VOLTAGE AT TERMINAL 34
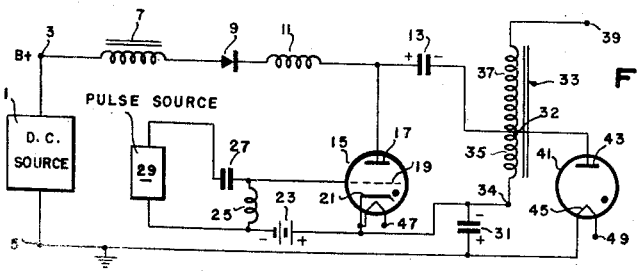
FIG. 1.
INVENTORS.
WILMER A. HOYER,
ROBERT W. WILSON,
BY John B. Davidson
ATTORNEY.

Patented Oct. 6, 1959

2,907,900
PULSE GENERATOR

Wilmer A. Hoyer, Houston, Tex., and Robert W. Wilson, Los Angeles, Calif., assignors, by mesne assignments, to Jersey Production Research Company, Houston, Tex., a corporation of Texas Application October 13, 1958, Serial No. 766,784

6 Claims. (Cl. 307—106)

This invention relates to electrical pulse generators and more particularly to a circuit for conserving the energy stored in an output pulse transformer after an electrical discharge through a primary winding thereof.

In a conventional type of pulse generator, a capacitive pulse forming means is charged from a direct current source and is discharged through a primary winding of an output pulse transformer. The capacitive element may be charged in series with a reactive element so that the maximum voltage appearing thereacross is of the order of twice the voltage of the D.C. source. As a result of the inductance and stray or distributed capacitance in the output transformer and the load capacitance, an oscillatory phenomena called "ringing" will occur after discharge of the pulse forming means through the transformer primary. Ringing currents usually have no useful purpose, and there results from them a considerable loss of energy. For certain applications involving the use of pulse-producing circuits of this nature, it is necessary to conserve as much energy as possible. For example, in connection with the use of a particle-accelertaor such as has found application in the radio-activity logging of boreholes in connection with the prospecting for petroleum deposits, energy must be transmitted along a relatively small-diameter cable for distances of 2 or 3 miles. Extremely high voltage pulses must be provided as the acceleration potential in the particle-accelerator and the use of a pulse generator such as generally described above is desirable. However, the large energy losses due to "ringing" present a serious problem which must be overcome.

Accordingly, one object of this invention is to provide a pulsed high voltage source particularly adapted for use with a particle-accelerator utilized in connection with the radioactivity logging of boreholes.

Another object is to provide a pulse generator having a reactive output circuit wherein the energy stored in the reactive output circuit after production of a desired pulse is conserved.

Other objects and features of the invention will become apparent upon consideration of the following description thereof when taken in connection with the accompanying drawing, wherein:

Fig. 1 is a schematic diagram of one embodiment of the invention; and

Figs. 2, 3, 4, 5, 6, and 7 are waveform representations of currents and voltages at various points in the circuit of Fig. 1, according to same time scale, which waveform representations are useful in understanding the operation of the circuit of Fig. 1.

In accordance with one aspect of the present invention, energy is stored in the output transformer of a pulse producing network wherein a capacitive pulse forming means is periodically charged from the D.C. source and discharged through the primary of the output transformer. This energy is utilized to charge an auxiliary capacitor after production of the desired output pulse. The auxiliary capacitor is connected in the circuit in such a way as to aid the D.C. source in subsequent charging of the pulse forming network.

According to a more specific aspect of the invention, a pulse producing network utilizing a series inductive-capacitive network to store energy for discharge through a high voltage output transformer to produce an output pulse is connected to a D.C. source. The energy stored in the transformer after production of the output pulse is utilized to charge a capacitor that couples the D.C. source to the transformer primary. The capacitor is charged to such a polarity as to add to the voltage of the source. Thereafter, energy is supplied to the pulse forming network from both the D.C. source and the auxiliary capacitor.

With reference now to Fig. 1, there is shown a direct current source 1 having a positive output terminal 3 and a negative output terminal 5. This D.C. source may be a battery, but it is more convenient to utilize a rectified and filtered direct current source of conventional design. For well logging purposes, a 400-cycle alternating current source has been found to be convenient for transmission of power down the borehole. The rectifier and filter may be carried within the logging sonde. The positive terminal 3 of D.C. source 1 is coupled to one terminal 32 of the primary 35 of high voltage output transformer 33 through series connected inductor 7, half-wave rectifier 9, radio frequency choke 11, and storage capacitor 13. Half-wave rectifier 9 is poled to permit current flow from terminal 3 to terminal 32. Capacitor 31 couples the other terminal of primary winding 35 to the negative terminal of D.C. source 1. The capacity of capacitor 31 is much greater than that of capacitor 13, preferably at least 50 times as great. Capacitor 13, which may be a capacitive pulse forming network rather than a simple capacitor, is utilized to store energy from D.C. source 1 for subsequent discharge through winding 35. Inductor 7 in combination with capacitor 13 produces a charging current for capacitor 13 of an oscillatory nature so that the peak voltage to which capacitor 13 may be charged is approximately twice the output voltage of D.C. source 1. This is in accordance with prior art teaching and will not be further dealt with here.

The function of radio frequency choke 11 is to isolate possible high frequency oscillations from diode 9 and inductor 7. Diode 9 prevents the discharge of energy in capacitor 13 through inductor 7, D.C. source 1, radio frequency choke 11, and primary winding 35. Therefore, capacitor 13 will remain charged to the peak voltage that appears thereacross.

For the purpose of discharging capacitor 13 through winding 35, there is provided a low resistance electronic switch 15 which may be a thyratron. Assuming that a thyratron is used, its plate 17 is connected to the common terminal of capacitor 13 and inductor 11. The thyratron grid 19 is normally biased to cut off by C-voltage source 23 which is coupled to grid 19 by radio frequency choke 25 in the usual manner. A pulse source 29 coupled to grid 19 by capacitor 27 is utilized to fire the thyratron at periodic intervals. Control pulse source 29 may be a relaxation oscillator of conventional design.

Output transformer 33 is shown as an autotransformer, although it is to be understood that the primary winding 35 and secondary winding 37 may be electrically separated in the usual manner if it is so desired. The advantage of utilizing an autotransformer in this application is that a somewhat higher output voltage may be obtained thereby. Output voltages appearing between transformer secondary output terminal 39 and ground will be coupled to the high voltage terminal of a particle-accelerator in the usual manner.

A half-wave rectifier 41, here shown as a gas diode, is connected between capacitor 31 and terminal 32 of transformer winding 35 so that conduction therethrough will be obtained when terminal 32 is more positive with respect to terminal 34 of transformer winding 35 than is terminal 5. More specifically, plate 43 of rectifier 41 is connected to terminal 32 of primary winding 35 and cathode 45 is connected to capacitor 31. While the plate 43 is shown connected to tap 32, it may be connected to a tap on the primary 35 or secondary 37 of transformer 33. Heating power for the cathode of rectifier 41 and the heater of thyratron 15 is supplied from separate terminals 47 and 49, respectively.

The operation of the circuit of Fig. 1 will now be explained with reference to the current and voltage waveforms of Figs. 2 through 7. First, however, it should be noted that the waveforms of Figs. 2 through 7 represent the voltages and currents at various points noted on the figures after the circuit has reached a relatively steady state condition.

Let it be assumed that control pulse source 29 is functioning to provide voltage pulses sufficient to bias thyratron 15 to conduction at a repetition rate of 1000 p.p.s. D.C. source 1, which may have an output voltage of about 1200 volts, is now activated and capacitor 13 will begin charging. Because of the presence of the inductor 7 in the circuit, the voltage across capacitor 13 will rise to approximately twice the voltage supplied by D.C. source 1. As soon as the voltage across capacitor 13 has reached a peak and the capacitor begins to discharge back through the loop including radio frequency choke 11, inductor 7, D.C. source 1, capacitor 31, and primary winding 35, rectifier 9 will function to prevent the flow of current around the loop. Capacitor 31 will have a very small charge with terminal 34 positive with respect to source terminal 5. When control pulse source 29 renders thyratron 15 conducting, capacitor 13 will be discharged through primary winding 35 and an output pulse will appear at terminal 39. Terminal 32 will be negative with respect to terminal 34 so that rectifier 41 will not conduct. Because of the capacitance of the load and capacitance in windings 35 and 37, the flow of current through winding 35 will set up a ringing or oscillatory current so that terminal 32 in due course will swing positive with respect to terminal 34. Current conduction through thyratron 15 will cease for reasons which will be explained below. As soon as the voltage at terminal 32 swings positive with respect to terminal 34, rectifier 41 will be rendered conductive so that capacitor 31 will charge to the polarity indicated in Fig. 1. Capacitor 13 will begin charging and will draw its charge both from D.C. source 1 and capacitor 31, since D.C. source 1 and capacitor 31 are in series, with the voltages thereacross adding. The voltage across capacitor 13 may reach a peak of about 1800 volts when 1200 volts are supplied by source 1. The charging current through winding 35 is quite small relative to the discharge current from capacitor 13 through winding 35 and thyratron 15. Therefore the output voltage at terminal 39 produced by the charging current through winding 35 will be negligibly small.

The next charging and discharging cycle will produce voltage and current waveforms substantially as shown in Figs. 2 through 7. The thyratron 15 is triggered at time $T_1$, and the voltage between terminal 32 and ground will drop from −1800 volts to −6000 volts. The voltage at the plate 17 of the thyratron will drop to a voltage slightly positive with respect to the voltage at cathode 21 so that conduction will be maintained through the thyratron. A large current pulse will flow through the thyratron as shown in Fig. 5. The voltage at terminal 32 will slowly rise until the output voltage at terminal 39 reaches an extreme negative value at time $T_2$. During the interval from $T_1$ to $T_2$, the voltage at the plate 17 of the thyratron will remain substantially constant. As soon as the voltage at terminal 39 starts swinging to a less negative value, there is a sudden downward kick in the voltage at terminal 32 and in the voltage at the plate of the thyratron. The sudden increase in the magnitude of the negative voltage at the plate of the thyratron is sufficient to extinguish the thyratron. The voltage at the plate of the thyratron quickly rises to about +1200 volts at time $T_3$. As soon as terminal 32 swings sufficiently positive with respect to terminal 5 to bring about conduction through rectifier 41, capacitor 31 will begin charging. Current flow through rectifier 41 is shown in Fig. 3. As soon as capacitor 31 has finished charging at time $T_4$, the voltage at terminal 32 will drop to about −1800 volts (the voltage across capacitor 31 when it is charged), and will remain at substantially this value until the next firing of thyratron 15. After one oscillation, the voltage at terminal 39 remains relatively constant until thyratron 15 again fires.

Fig. 7 depicts the voltage across capacitor 13. The voltage is generally saw tooth in form, varying between about −1800 volts and −2400 volts.

The pulsed power supply described above has been found to require only one-half to one-fourth of the input power required by similar devices known to the prior art. In a typical example, it has been found possible to produce 100,000 volt pulses at a pulse repetition rate of 1000 p.p.s. while utilizing only 85 watts of power. Prior art devices have required substantially more than 200 watts of power to accomplish the same function. As a result of the increase in effective voltage produced by capacitor 31, it has also been found possible to use a comparatively low voltage D.C. power source, with a consequent reduction in insulation problems.

While it is not desired to limit the invention to any specific circuit constants, the following circuit constants are given as illustrative of values of circuit elements which may be utilized in the circuit of Fig. 1:

| | |
|---|---|
| Inductor 7 _____henrys__ | 6 |
| Radio frequency choke 11 _____millihenrys__ | 2 |
| Radio frequency choke 25 _____do____ | 1 |
| Capacitor 13 _____microfarads__ | .02 |
| Capacitor 27 _____do____ | .015 |
| Capacitor 31 _____do____ | 1 |
| Tube 15 _____ Type E37–B | |
| Tube 41 _____ Type 3B28 | |

The invention not to be restricted to the specific structural details, arrangements of parts, or circuit connections herein set forth, as various modifications thereof may be effected without departing from the spirit and scope of this invention.

What is claimed is:

1. In a high voltage pulse producing network including an output transformer having primary and secondary windings, a direct current source, an inductor, a first capacitor, and a half-wave rectifier serially connected with each other and with said primary winding, and electronic switch means for periodically discharging said capacitor through said primary winding; the improvement comprising a second capacitor serially connected with said inductor, said rectifier, said first capacitor means and said transformer primary, and a second half-wave rectifier means coupling said second capacitor across said transformer primary; said second half-wave rectifier being poled to charge said second capacitor in a sense opposite to the polarity of the charge accumulated by said second capacitor from said direct current source.

2. In a high voltage pulse producing network including an output transformer having primary and secondary windings, a direct current source, an inductor, a first capacitor, and a half-wave rectifier serially connected with each other and with said primary winding, and means including thyratron means for periodically discharging said capacitor through said primary winding; the improvement comprising a second capacitor serially connected with said inductor, said rectifier, said first capacitor means and said transformer primary, and a second half-wave rectifier means coupling said second capacitor across said transformer primary; said second half-wave rectifier being poled to charge said second capacitor in a sense opposite to the polarity of the charge accumulated by said second capacitor from said direct current source.

3. In a high voltage pulse producing network including an output transformer having a primary winding and a secondary winding: first capacitor means; second capacitor means; a source of direct current; an inductive reactor coupling serially connected to said first and second capacitor means in series said direct current source to said primary winding; switch means for discharging said capacitor means through said primary winding; and half-wave rectifier means coupling said primary winding across said second capacitor for charging said second capacitor to a voltage having a potential opposite in sense to the potential to which said second capacitor would be charged by said power source, said second capacitor having a capacity at least 50 times the capacity of said first capacitor.

4. In a pulse producing network including a current source, an output transformer having a primary winding, means including capacitor means for coupling said source to said winding, and switching means for discharging said capacitor through said winding; circuit means including half-wave rectifier means for returning to said capacitor energy stored in said transformer after discharge of said capacitor through said primary winding, said half-wave rectifier being poled to couple said circuit means to said primary winding when the voltage across said primary winding is opposite in polarity to the polarity across said winding on discharge of said capacitor therethrough.

5. In a high-voltage pulse producing circuit wherein the energy from a direct current source is stored in a reactive member and is periodically discharged through the primary winding of a transformer, the improvement which comprises a capacitor coupling said direct current source to said primary winding, and rectifier means coupling said capacitor across said primary winding when the polarity of the voltage across said primary is opposite to the polarity thereacross when said reactive member is discharged therethrough, the voltage of said direct current source and the voltage across said capacitor thereupon being in series adding for energization of said reactive member.

6. In a high-voltage pulse producing circuit wherein the energy from a direct current source is stored in a reactive member and is periodically discharged through the primary winding of a transformer, the improvement which comprises a capacitor coupling said direct current source to said primary winding, and means for coupling said capacitor across said primary winding after discharge of said reactive means through said primary winding to charge said capacitor to a voltage having a polarity opposite the polarity to which said capacitor would be charged by said direct current source.

No references cited.